United States Patent

Manno

Patent Number: 6,050,024
Date of Patent: Apr. 18, 2000

[54] RODENT TRAP WITH DIVERTER

[76] Inventor: Joseph T. Manno, Star Rte., Box 24, Kane, Pa. 16735

[21] Appl. No.: 09/325,670

[22] Filed: May 13, 1999

Related U.S. Application Data

[63] Continuation-in-part of application No. 09/200,231, Nov. 25, 1998.

[51] Int. Cl.⁷ .................................................. A01M 23/30
[52] U.S. Cl. .................................................. 43/81
[58] Field of Search .............................. 43/81, 81.5, 83.5, 43/82, 83, 77

[56] References Cited

U.S. PATENT DOCUMENTS

| | | |
|---|---|---|
| 887,547 | 5/1908 | Trumble . |
| 1,485,976 | 3/1924 | Gibbs . |
| 1,930,886 | 10/1933 | Scott . |
| 2,475,884 | 7/1949 | Fitzsimons . |
| 3,058,256 | 10/1962 | Wernham . |
| 3,757,456 | 9/1973 | Lucci . |
| 4,245,423 | 1/1981 | Souza et al. . |
| 4,369,595 | 1/1983 | Kness et al. . |
| 4,574,519 | 3/1986 | Eckebrecht . |
| 4,711,049 | 12/1987 | Kness . |
| 5,001,857 | 3/1991 | McDaniel et al. . |
| 5,142,813 | 9/1992 | Prostler . |
| 5,259,152 | 11/1993 | Taylor . |
| 5,477,635 | 12/1995 | Orsano . |
| 5,528,853 | 6/1996 | Dufaux et al. . |
| 5,546,696 | 8/1996 | Parker, Jr. . |

*Primary Examiner*—Jack W. Lavinder
*Attorney, Agent, or Firm*—Nixon & Vanderhye P.C.

[57] ABSTRACT

A rodent trap comprising a platform having a flat upper surface; a spring loaded trapping member pivotally movable between cocked and actuated positions; a retaining arm pivotally mounted on the platform at one end thereof and adapted to hold the trapping member in a cocked configuration, the retaining arm having a free end; a diverter mounted on the platform and having a vertical wall portion formed with an open ended slot; the diverter having a bait anchor extending forwardly and substantially parallel to the free end of the retaining arm when the retaining arm overlies the trapping member, whereby bait inserted over the free end of the retaining arm and the one end portion of the bait anchor serves to hold the retaining arm in overlying relationship with the trapping member.

6 Claims, 2 Drawing Sheets

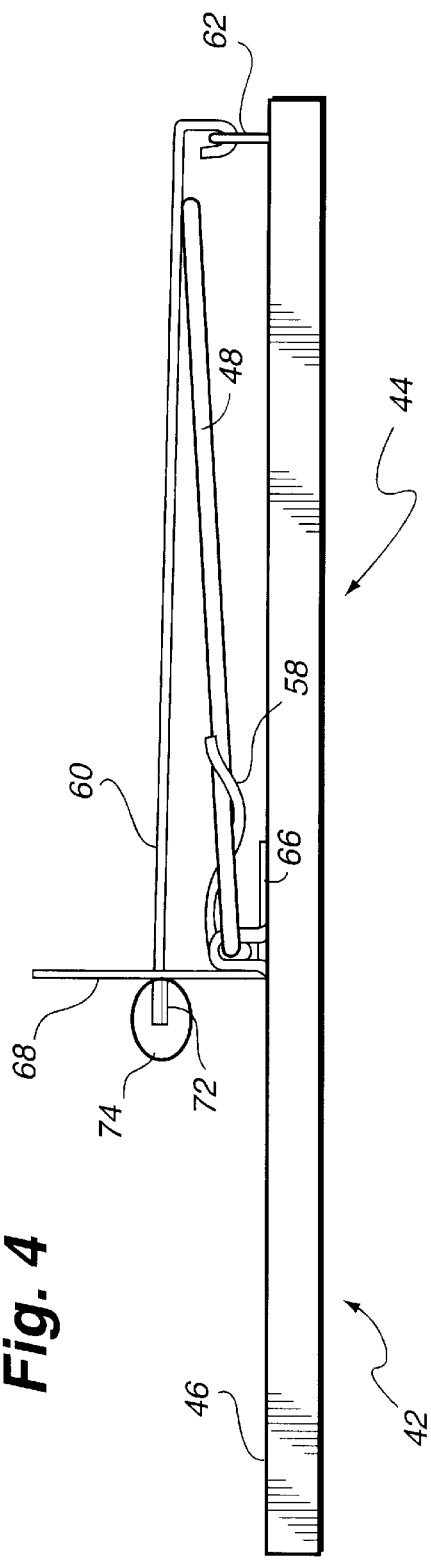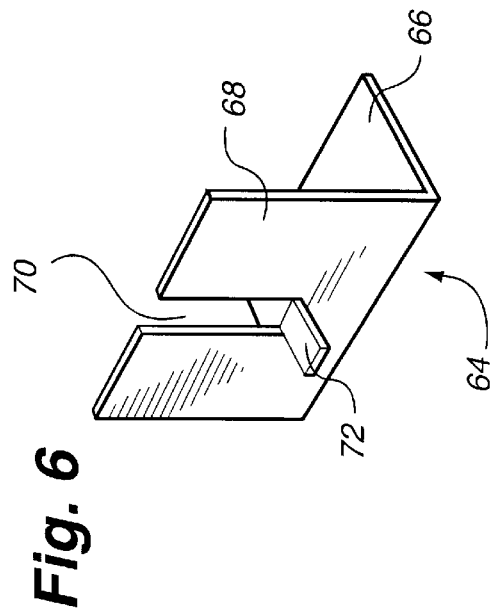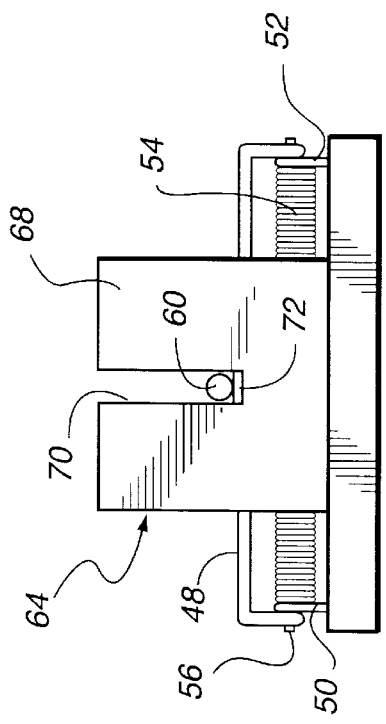

RODENT TRAP WITH DIVERTER

RELATED APPLICATIONS

This application is a continuation-in-part application of copending application Ser. No. 09/200,231, filed Nov. 25, 1998, still pending.

BACKGROUND AND SUMMARY OF THE INVENTION

Conventional spring loaded traps tend to be overly sensitive to movements during setting and placement of the traps, oftentimes resulting in accidental and premature actuation. This is due primarily to the manner in which the retaining bar is engaged with the bait platform by a detent at the end of the bar. Specifically, the detent is designed to "catch" on a projection in the bait platform, after the bait has been placed on the platform. This arrangement has proven to be effective but highly sensitive to subsequent handling of the trap, e.g., placing in the desired location in the cocked position.

This invention seeks to reduce the above mentioned sensitivity while, at the same time, maintain a high degree of efficiency and reliability. To this end, a unique bait anchor is employed which cooperates with the free end of the retaining bar. Specifically, these two components serve to hold the bait, but do not engage each other. It is the bait itself which "straddles" the retaining bar and bait anchor, and which holds the retaining bar in its position overlying the cocked, spring-loaded trapping member. In order to insure that the retention bar will be held in place, the bait must have sufficient consistency. As the rodent chews on the bait, the retention bar is freed, thereby causing the trapping member to close under the influence of a conventional coil spring.

In a second and preferred embodiment of the invention, the bait anchor is formed as part of a diverter or shield element which guides the rodent around the trap in order to have access to the bait. Thus, the rodent must approach the bait from the front of the trap, thereby making the trap more reliable and effective.

It will be appreciated that the trap construction in accordance with this invention is less complex than conventional traps and therefore, reduces the cost of manufacture. In addition, the trap construction facilitates the application of the bait to the trap, the setting of the trap in the desired location and the trap can accommodate various kinds of bait, both soft and hard.

Accordingly, the present invention provides a rodent trap comprising a platform having a flat upper surface; a spring loaded trapping member pivotally movable between cocked and actuated positions; a retaining arm pivotally mounted on the platform at one end thereof and adapted to hold the trapping member in a cocked configuration, the retaining arm having a free end; a diverter mounted on the platform and having a vertical wall portion formed with an open ended slot adapted to receive the free end of the retaining arm; the diverter having a bait anchor extending forwardly and substantially parallel to the free end of the retaining arm when the retaining arm overlies the trapping member, whereby bait inserted over the free end of the retaining arm and the bait anchor serves to hold the retaining arm in overlying relationship with the trapping member.

Other objects and advantages of the present invention will become apparent from the detailed description which follows.

BRIEF DESCRIPTION OF THE DRAWINGS

FIG. 4 is a side elevation of a trap in accordance with a preferred embodiment of the invention;

FIG. 5 is a front elevation of the trap shown in FIG. 4; and

FIG. 6 is a perspective view of a diverter or shield component used in the trap construction shown in FIGS. 4 and 5.

BEST MODE FOR CARRYING OUT THE INVENTION

Figure 1:
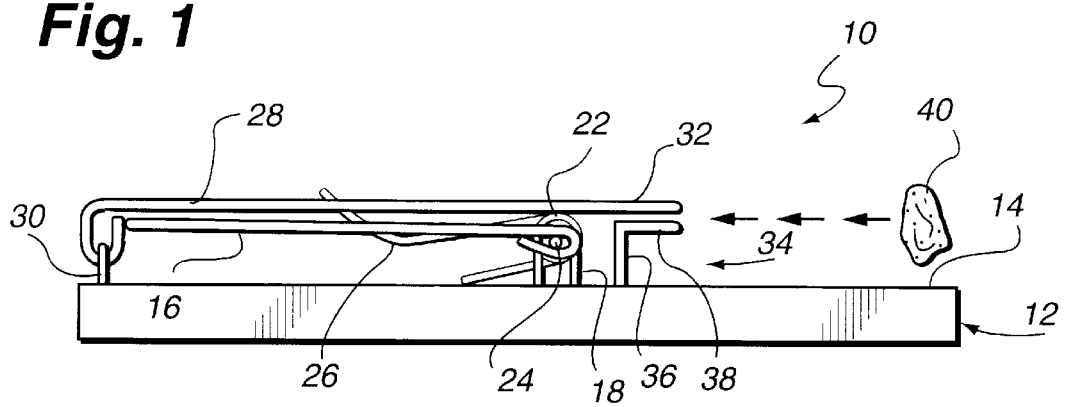
FIG. 1 is a side elevation of a trap in accordance with a first embodiment of the invention.
Figure 2:
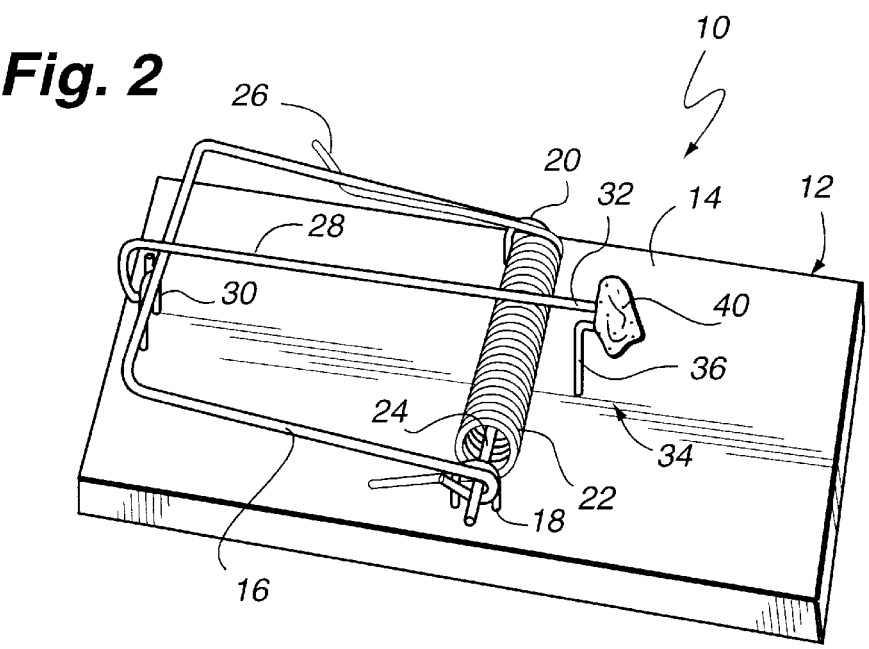
FIG. 2 is a perspective view of the trap shown in FIG. 1.

With reference to FIGS. 1 and 2, the trap 10 in accordance with one exemplary embodiment of this invention is a mousetrap which includes a standard base or platform 12 (wood or other suitable material) having a flat upper surface 14. The generally rectangular trapping member or bail 16 is fixed to the upper surface 14 of the platform 12 via brads 18, 20. A coil spring 22 overlies the forward leg 24 of the trapping member and, by means of spring extension arm 26, biases the trapping member in a clockwise direction as viewed in FIGS. 1 and 2, with the forward leg 24 serving as a pivot or axle. The trap construction as defined above is conventional.

A retaining arm 28 is loosely pivotally mounted on the platform upper surface 14 by another U-shaped brad 30 which is driven into the platform. The arm 20 is adapted to extend over the trapping bar 16, beyond the end 24, as shown in the Figures. The free end 32 of arm 28 cooperates with a bait anchor 34 which includes a vertical portion 36 and a 90° angle portion 38 which extends horizontally away from the spring 22. Anchor 34 may be rigid wire or other suitable material. With the trapping member 16 cocked as shown in FIG. 1, the free end 32 of the retaining arm 28 is located above and substantially parallel to the bait anchor portion 38 as best seen in FIG. 1, i.e., in both horizontal and vertical alignment.

Bait 40 can then be inserted over the elements 32 and 38, with the bait itself holding the retaining arm 28 over the trapping bar to maintain the latter in the cocked position. In this regard, the bait 40 must have sufficient consistency to hold the free end 32 in place, to prevent premature actuation. I have discovered that gum drops, raisins and many other common household food particles for example, provide the required holding power and serve well as bait. This eliminates the need for specially manufactured bait.

Figure 3:
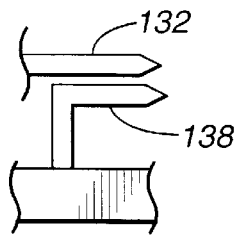
FIG. 3 is a partial side elevation showing an alternative construction.

Referring to FIG. 3, the free end 132 of the retaining arm and the horizontal end portion 138 of the bait anchor may be sharpened with, e.g., 45° tapers or bevels, in order to facilitate the placement of harder bait such as peanuts or certain seeds preferred by mice.

With the bait in place, the trap is easily placed in the desired location, and the retaining arm and bait anchoring configuration as described above are less sensitive to slight movements, so that the user need not be as concerned with accidental actuation during placement of the trap. When the mouse begins to feed on the bait, the arm 28 will be freed and the trapping member 16 will spring to the closed or trapping position.

With reference now to FIGS. 4–6, a trap in accordance with a second and preferred embodiment of the invention is illustrated. The trap 42 includes a standard base or platform 44 having a flat upper surface 46 with a generally rectangular trapping member or bail 48 fixed to the upper surface 46 in a conventional manner (similar to the embodiment illustrated in FIGS. 1–3), utilizing brads 50, 52 and a coil spring 54 which extend over the forward leg 56 of the bail 48. Extension arm 58 of the spring 54 biases the trapping member in a counterclockwise direction, as viewed in FIG. 4, with the forward leg 56 serving as a pivot or axle.

A retaining arm 60 is loosely pivotally mounted on the upper surface 46 of the base or platform 44 by means of a brad 62, again in conventional fashion. The retaining arm 60 is adapted to extend over the trapping bar or bail 48 beyond the forward leg 56. In this embodiment, a diverter or shield component 64 replaces the bait anchor 34 utilized in the embodiment shown in FIGS. 1–3. The diverter or shield 64 is generally L-shaped, with a horizontal base or mounting portion 66 and a vertical diverter portion 68. The base 66 may be secured to the upper surface 64 of the platform 44 by any suitable means, including staples, brads, adhesive or the like. A slot 70 is formed in the center portion of the vertical portion 68, with a horizontal tab 72 extending forwardly at the base of the slot 70. The tab 72 thus serves as a bait anchor, much in the same way as bait anchor 34, while the slot 70 guides the free end of the retaining arm 60 into position adjacent the tab 72. The diverter or shield 64 is preferably a unitary member formed of a suitable plastic material.

With reference to FIG. 4, it may be seen that the retaining bar 60 is rotated over the bail 48 with the forward end of the retaining bar moved downwardly through the slot 70 into substantially parallel mating engagement with the bait anchor 72. The bait 74 can then be inserted over the anchor 72 and forward end of retaining bar 60, with the bait having sufficient consistency to hold the retaining bar 60 in place and thus prevent premature actuation. With this arrangement, in order to reach the bait 74, the rodent must approach the bait from the front of the trap, i.e., from within the trapping zone, thereby eliminating the possibility of the rodent straddling the retaining bar 60 while approaching the bait from behind and simply being thrown away from the tap upon actuation.

While the trap construction as described above relates primarily to mousetraps it will be appreciated that the unique construction is equally applicable to other and larger rodent traps, for example, rat traps.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rodent trap comprising:

a platform having a flat upper surface;

a spring loaded trapping member pivotally movable between cocked and actuated positions;

a retaining arm pivotally mounted on said platform at one end thereof and adapted to hold the trapping member in a cocked configuration, said retaining arm having a free end;

a stationary diverter fixed to said platform and having a vertical wall portion formed with a vertically oriented open ended slot adapted to receive said free end of said retaining arm; said diverter having a horizontal tab serving as a bait anchor extending forwardly from said base of said slot and substantially parallel to said free end of said retaining arm when said retaining arm overlies said trapping member and when said retaining arm is received in said slot, said retaining arm overlies said horizontal tab, whereby bait inserted over said free end of said retaining arm and said bait anchor serves to hold said retaining arm in overlying relationship with said trapping member.

2. The rodent trap of claim 1 wherein said diverter includes a horizontal portion by which the diverter is fixed to said upper surface of said platform.

3. The rodent trap of claim 1 including bait having a consistency sufficient to hold said retaining arm in overlying relationship with said trapping member.

4. The rodent trap of claim 1 wherein said free end of said retaining arm and said horizontal tab are in substantial vertical alignment when the trapping member is in the cocked position.

5. The rodent trap of claim 1 wherein said diverter is made of plastic.

6. The rodent trap of claim 1 wherein said vertical portion extends in a plane transverse to said retaining arm.

* * * * *